United States Patent
Weber et al.

(10) Patent No.: US 11,522,892 B2
(45) Date of Patent: Dec. 6, 2022

(54) METHOD AND DEVICE FOR INTRUSION DETECTION IN A COMPUTER NETWORK

(71) Applicant: Robert Bosch GmbH, Stuttgart (DE)

(72) Inventors: Andreas Weber, Weissach (DE); Janin Wolfinger, Birkenfeld (DE); Jens Gramm, Tuebingen (DE); Michael Herrmann, Dusseldorf (DE); Wolfram Gottschlich, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 16/921,375

(22) Filed: Jul. 6, 2020

(65) Prior Publication Data

US 2021/0014255 A1 Jan. 14, 2021

(30) Foreign Application Priority Data

Jul. 10, 2019 (DE) .......................... 102019210224.7

(51) Int. Cl.
| | |
|---|---|
| *H04L 29/06* | (2006.01) |
| *H04L 9/40* | (2022.01) |
| *G06F 9/30* | (2018.01) |
| *H04L 43/106* | (2022.01) |
| *H04L 43/16* | (2022.01) |
| *H04L 101/622* | (2022.01) |

(Continued)

(52) U.S. Cl.
CPC ...... *H04L 63/1425* (2013.01); *G06F 9/30101* (2013.01); *G06F 9/4812* (2013.01); *H04L 12/4641* (2013.01); *H04L 43/106* (2013.01); *H04L 43/16* (2013.01); *H04L 61/6022* (2013.01); *H04L 63/0236* (2013.01); *H04L 63/1416* (2013.01); *H04L 63/1466* (2013.01)

(58) Field of Classification Search
CPC ............ H04L 63/1425; H04L 12/4641; H04L 43/106; H04L 43/16; H04L 61/6022; H04L 63/0236; H04L 63/1416; H04L 63/1466; G06F 9/30101; G06F 9/4812
See application file for complete search history.

(56) References Cited

U.S. PATENT DOCUMENTS

| | | | | | |
|---|---|---|---|---|---|
| 7,463,639 | B1 * | 12/2008 | Rekhter | .............. | H04L 12/4641 370/467 |
| 8,006,303 | B1 * | 8/2011 | Dennerline | ......... | H04L 63/1408 726/23 |
| 10,264,020 | B1 * | 4/2019 | Nanda | ................. | H04L 43/0876 |

(Continued)

*Primary Examiner* — Shin-Hon (Eric) Chen
(74) *Attorney, Agent, or Firm* — Norton Rose Fulbright US LLP; Gerard Messina (57) ABSTRACT

A device and method for intrusion detection in a computer network. A data packet is received at an input of a hardware switch unit, an output of the hardware switch unit is selected for sending the data packet or a copy as a function of security layer information from the data packet and of a hardware address, context information for the data packet being determined, an actual value from a field being compared in a comparison by a hardware filter with a setpoint value for values from this field, the field including security layer data or mediation layer data, and an interrupt for a computing device being triggered as a function of a result of the comparison, an analysis for detecting an intrusion pattern in a network traffic in the computer network, triggered by the interrupt, being carried out as a function of the context information for the data packet.

14 Claims, 3 Drawing Sheets

(51) Int. Cl.
*G06F 9/48* (2006.01)
*H04L 12/46* (2006.01)

(56) References Cited

U.S. PATENT DOCUMENTS

| | | | |
|---|---|---|---|
| 2003/0065944 A1* | 4/2003 | Mao | H04L 63/0227 709/229 |
| 2008/0201772 A1* | 8/2008 | Mondaeev | H04L 63/20 726/13 |
| 2010/0268818 A1* | 10/2010 | Richmond | H04L 43/00 709/224 |
| 2012/0240185 A1* | 9/2012 | Kapoor | G06F 16/2358 726/1 |
| 2016/0234091 A1* | 8/2016 | Emmadi | H04L 43/062 |
| 2017/0126745 A1* | 5/2017 | Taylor | H04L 63/0227 |
| 2018/0183756 A1* | 6/2018 | Bangalore Krishnamurthy | H04L 63/1416 |

\* cited by examiner

METHOD AND DEVICE FOR INTRUSION DETECTION IN A COMPUTER NETWORK

CROSS REFERENCE

The present application claims the benefit under 35 U.S.C. § 119 of German Patent Application No. DE 102019210224.7 filed on Jul. 10, 2019, which is expressly incorporated herein by reference in its entirety.

FIELD

The present invention is directed to a method and to a device for intrusion detection in a computer network.

BACKGROUND INFORMATION

The task of a "Network Intrusion Detection and Prevention System" (NIDPS) is to identify and to respond to anomalies in the network traffic of a distributed computer system. NIDPS are systems that are typically used to detect and to prevent intrusions in corporate networks, so-called enterprise networks. NIDPS may also be used in automotive networks. Automotive networks are internal networks of vehicles that include "Electronic Control Units" (ECUs) as network nodes.

Due to functional differences between enterprise networks and automotive networks, NIDPS for enterprise networks are unable to be efficiently used for automotive networks.

It is therefore desirable to provide an NIDPS for an automotive network.

SUMMARY

In accordance with the present invention, an NIDPS is provided for an automotive network. In order to provide an NIDPS for an automotive network, differences between automotive networks and enterprise networks should be taken into account. These differences are to be found in their network structure, network dynamics and the network nodes.

Network Structure:

An enterprise network typically follows a client-server model, in which there is a smaller number of dedicated server-network nodes, which offer services to a typically higher number of client-network nodes. Automotive networks are made up of ECUs, which exchange sensor signals and actuator commands.

Enterprise networks are, in general, significantly larger and more complex than automotive networks. The totality of an enterprise network is significantly more segmented, physically or logically separated in different zones and sub-networks. ECUs in typical automotive networks are, if at all, separated by "gateways" into a few sub-networks or logically separated at the Ethernet level via so-called "Virtual Local Area Networks" (VLANs).

Network Dynamics:

Enterprise networks and automotive networks differ in terms of their dynamics with which the network is changed and operated.

In enterprise networks, the connected network nodes change dynamically. For changes in server-network nodes, an adaptation in the configuration of the security systems such as, for example, the NIDPS, may potentially also be carried out. In contrast, such adaptations in network nodes, which are clients, are generally not possible. This is due to the fact that some clients are connected to the network from alternating locations and are interchanged relatively frequently. It is also not possible to predict which applications are executed on a client.

ECUs in automotive networks are interchanged very rarely, if at all, and are then frequently also replaced by an identical copy. It is therefore unlikely that anything changes in the functionality of the network. In an automotive network, the network nodes are known without exception. The respectively running applications on the network are also well defined and details about the network communication may be predefined.

In enterprise networks, it is also customary for nodes to establish connections into an enterprise network from the outside and to represent a part of the internal data traffic. In an automotive network, all communication nodes of the network responsible for the vehicle functions are part of the internal vehicle network. External nodes are granted access to the internal vehicle network only for specific functions and in limited scope, for example, for diagnosis or for mobile terminals.

In enterprise networks, different users may potentially use the same client. In ECUs of automotive networks, there are no users, but merely applications, which perform their service fully automatically.

Network Nodes:

With regard to resources, the network nodes of an enterprise network are, in general, multiple times more resource-intensive—for example with respect to memory and performance—than ECUs of an automotive network.

With regard to the software, the network nodes in enterprise networks are usually equipped with widely common standard operating systems and standard software, for which security weaknesses are known. In general, however, it is not possible to establish which software is executed on which client system since, in many cases, users are able to install and uninstall software. For this reason, a key focus of NIDPS systems in enterprise networks is to detect in a signature-based manner whether the attempt is being made to exploit known security weaknesses. The network nodes in automotive networks are generally equipped with software that has been specifically developed for this particular application. A majority of the signatures from NIDPS systems for enterprise networks is not usable, and there are no larger databases relating to weaknesses known specifically for automotive networks.

The fundamental task of an NIDPS, i.e., detecting and responding to anomalies in the network traffic, is the same in enterprise networks and automotive networks. However, it is apparent from the aforementioned points that the basic functionality of an efficient NIDPS for automotive networks must differ fundamentally from that of an NIDPS for enterprise networks. An NIDPS for an automotive network must take advantage of the known and static network structure as well as of the significantly lower dynamics of the network users, in order to be able to efficiently detect anomalies with limited resources.

In accordance with an example embodiment of the present invention, a method for detecting intrusions in a computer network provides that a data packet is received at an input of a hardware switch unit, an output of the hardware switch unit for sending the data packet or a copy of the data packet being selected as a function of security layer information from the data packet and as a function of a hardware address, context information for the data packet being determined, an actual value from a field of data packets being compared in a comparison by a hardware filter with a setpoint value for values from this field, the field including security layer data or mediation layer data, and an interrupt for a computing device being triggered as a function of a result of the comparison, an analysis for detecting an intrusion pattern in a network traffic in the computer network, triggered by the interrupt, being carried out by the microprocessor as a function of the context information for the data packet. The interrupt is triggered, in particular, if a deviation between the actual value and the setpoint value exists. The interrupt may be triggered if the deviation reaches, exceeds or falls below a threshold value.

The context information for the data packet is preferably stored in a register, a register access of the microprocessor to the register taking place for the purpose of analysis. This is a particularly effective approach in terms of the computer resources.

It is preferably provided that the context information for the data packet is stored in the register, if a deviation between the actual value and the setpoint value exists, or exceeds a threshold value. Thus, if needed, i.e., if a deviation exists, the context information is particularly effectively provided for the intrusion detection.

It is preferably provided that context information for the data packet is determined and stored in the register as a function of the result of the analysis. The context information is therefore also updated in the register as a function of the analysis.

It is preferably provided that the hardware filter includes a Ternary Content Addressable Memory, in which a mask for the setpoint value is stored, the actual value being compared with the mask stored in the Ternary Content Addressable Memory, and it being established as a function of the result of the comparison whether or not a deviation exists. Freely-configurable checks are therefore possible.

It is preferably provided that the setpoint value characterizes a hardware address, in particular, a Medium Access Control address, the actual value being determined as a function of data from a hardware address field, in particular a Medium Access Control address of a data packet at the input or output. This makes the intrusion detection possible on the basis of the underlying Medium Access Control protocol.

It is preferably provided that the setpoint value characterizes a Virtual Local Area Network, and the actual value is determined as a function of data, which characterize the association of a data packet at the input or output with a Virtual Local Area Network. This makes the intrusion detection possible on the basis of the underlying Virtual Local Area Network Protocol.

It is preferably provided that the presence of a deviation is detected, either when the hardware filter at the input or output for a tagged Virtual Logical Area Network establishes an untagged Virtual Logical Area Network data packet, or when the hardware filter at the input or output for an untagged Virtual Logical Area Network establishes a tagged Virtual Logical Area Network data packet. This makes the intrusion detection possible on the basis of the tag.

It is preferably provided that the presence of a deviation is detected when the hardware filter at the input or output establishes a data packet having an unknown Ethertype, including a false checksum, a false packet length or a false packet structure. This makes the intrusion detection possible on the basis of the underlying Ethertype.

It is preferably provided that the presence of a deviation is detected when a Dynamic Host Configuration Protocol filter at the input or output establishes 328 a Dynamic Host Configuration Protocol packet for Internet Protocol Version 4 and/or for Internet Protocol Version 6 including Dynamic Host Configuration Protocol port 67 and/or port 68, a Transmission Control Protocol or User Datagram Protocol filter at the input or output establishes 328 a Transmission Control Protocol or User Datagram Protocol Broadcast message for Internet Protocol Version 4 and/or for Internet Protocol Version 6, a Precision Time Protocol filter at the input or output establishes a Precision Time Protocol message 328, the content of which, in particular, time stamp, sequence number, correction field, is stored at least temporarily in a register for context information.

This makes the intrusion detection possible on the basis of the respectively underlying protocol.

In accordance with an example embodiment of the present invention, a corresponding device is designed as a system on a chip system, which includes a hardware switch unit, a hardware filter, a register and a computer device for the intrusion detection, and is designed to carry out the method. An intrusion detection is thus particularly effectively presentable in an integrated approach.

The hardware switch unit is preferably designed to store the context information for the data packet in the register, the microprocessor being designed to carry out a register access to the register for the purpose of analysis. This enables a direct access.

The hardware switch unit is preferably designed to store the context information for the data packet in the register if a deviation between the actual value and the setpoint value exists, or exceeds a threshold value. The direct access to the memory for the context information is advantageous, in particular, with respect to the efficiency of the function of the hardware switch unit.

The microprocessor is advantageously designed to determine context information for the data packet as a function of a result of the analysis and to store it in the register. The direct access to the memory of the context information is advantageous, in particular, with respect to the efficiency of the intrusion detection.

A Ternary Content Addressable Memory 108, an Address Translation Unit, a Virtual Local Area Network unit, a Dynamic Host Configuration Protocol filter, a Transmission Control Protocol or User Datagram Protocol filter and/or a Precision Time Protocol filter is/are designed as a hardware filter to analyze a data packet for the intrusion detection and to provide the interrupt to the microprocessor for the intrusion detection as a function of the result of the check. This makes a particularly advantageous method possible in this respect.

Additional advantageous specific embodiments result from the following description and from the figures.

DETAILED DESCRIPTION OF EXAMPLE EMBODIMENTS

Figure 1:
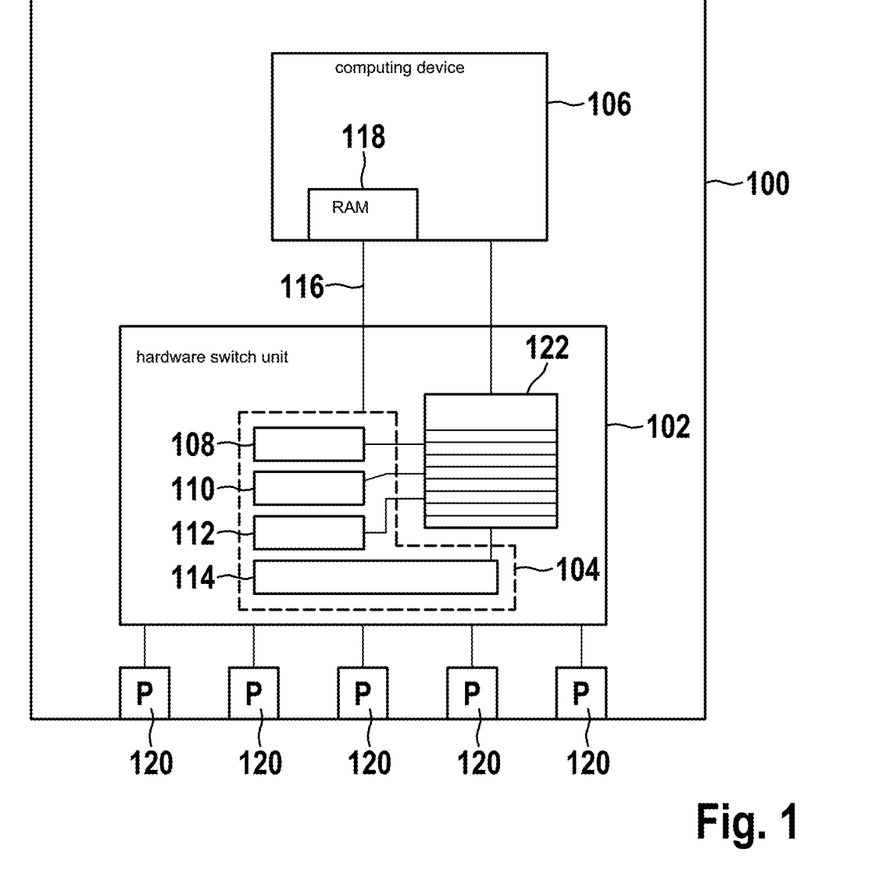
FIG. 1 schematically shows a representation of a device for intrusion detection in accordance with an example embodiment of the present invention.

FIG. 1 schematically shows a representation of a device 100 for intrusion detection in a computer network. Device 100 is designed as a system on a chip system.

Device 100 includes a hardware switch unit 102, a hardware filter 104 and a computing device 106 for the intrusion detection. Computing device 106 is described below as an example of a microprocessor. A microcontroller may also be used instead of a microprocessor.

The computer network in the example is an automotive Ethernet network. The automotive Ethernet described by way of example is based on Ethernet Standard IEEE 802.3-2018 and may include elements from IEEE 802.1Q, 100BASE-T1 or 1000BASE-T1. BroadR-Reach or 100BASE-T1/X specify the physical transport medium in layer 1. There are additional standards in the Ethernet Protocol stack, which are in part specific to the automotive context, for example, DoIP, SOME/IP and in part IPv4, TSN.

In the automotive Ethernet context, only parts of a standard are utilized in part and others not, i.e., not the entire scope of the protocol is also utilized.

Hardware switch unit 102 in the example includes an Ethernet switch.

Hardware filter 104 in the example includes a Ternary Content Addressable Memory 108, and Address Translation Unit 110, a Virtual Local Area Network Translation unit 112 and additional hardware filters 114, for example, a Dynamic Host Configuration Protocol filter, a Transmission Control Protocol or User Datagram Protocol filter and/or a Precision Time Protocol filter.

Hardware filter 104 is designed to analyze a data packet for the intrusion detection. Hardware filter 104 is optionally designed to provide the data packet or a copy of the data packet to microprocessor 106 for the intrusion detection as a function of the result of the check. For this purpose, hardware filter 104 and microprocessor 106 are optionally connected to a data line 116. Microprocessor 106 in the example is part of a microcontroller, which includes a random access memory 118. Data packets are transmittable via data line 116 from hardware filter 102 into random access memory 118 for the intrusion detection.

Device 100 includes at least one input and at least one output. These are implemented as ports 120 for hardware switch unit 102.

Hardware switch unit 102 includes a register 122 for context information relating to data packets.

Hardware switch unit 102 includes a memory for hardware addresses of devices of the computer network, which are coupled to device 100. The memory in the example includes register 122 for the context information. In one aspect, the memory is a random access memory. The memory may also be designed as a non-volatile read and write memory, which is able to permanently store the content information.

Hardware switch unit 102 is designed to receive a data packet at an input. Hardware switch unit 102 is designed to select an output of device 100 for sending the data packet or a copy of the data packet as a function of security layer information from the data packet and as a function of a hardware address from a memory.

Microprocessor 106 is designed to carry out an analysis for detecting an intrusion pattern in a network traffic in the computer network as a function of context information from register 122. Microprocessor 106 is designed to read context information from register 122, to determine context information for register 122 as a function of the result of the analysis, and to write the latter context information into register 122. Microprocessor 106 is designed to receive an interrupt from hardware switch unit 102. Microprocessor 106 is designed to carry out the analysis when the interrupt is received.

Hardware filter 104 is designed to compare in a comparison an actual value from a field of data packets with a setpoint value for values from this field. The field includes security layer data or mediation layer data. Hardware filter 104 is designed to send the interrupt to microprocessor 106 as a function of a result of the comparison if a deviation between the actual value and the setpoint value exists, or exceeds a threshold value.

Forms of hardware filter 104 are described in the following.

Hardware filter 104 includes, for example, a Ternary Content Addressable Memory 108, in which a mask for the setpoint value is stored. Hardware filter 104 in this case is designed to compare the actual value with the mask stored in the Ternary Content Addressable Memory, and to establish as a function of the result of the comparison whether or not the deviation exists.

The setpoint value, for example, characterizes a hardware address from the memory. The hardware address is, in particular, a Medium Access Control address of the security layer. Hardware filter 104 in this example includes Address Translation Unit 110, which is designed to determine the actual value as a function of data from a hardware address field of a data packet at an input or output of device 100, to compare the actual value in a comparison with the setpoint value, and to establish as a function of the result of the comparison whether or not the deviation exists.

Address Translation Unit 110 is a unit in the security layer, which selects the output in hardware switch unit 102 at which a received data packet or its copy is sent during operation.

The setpoint value, for example, characterizes a Virtual Local Area Network. The setpoint value is stored in a memory, for example. Hardware filter 104 includes a Virtual Local Area Network Translation Unit 112, which is designed to determine the actual value as a function of data, which characterize the association of a data packet at an input or output of device 100 with a Virtual Local Area Network, to compare the actual value in a comparison with the setpoint value, and to establish as a function of the result of the comparison whether not the deviation exists.

Virtual Local Area Network Translation Unit 112 is a unit in the security layer, which selects the output in hardware switch unit 102 at which a received data packet or its copy is sent during operation in a Virtual Local Area Network.

Hardware filter 104 may be designed to detect the presence of a deviation, either when hardware filter 104 at an input or output of the device for a tagged Virtual Logical Area Network establishes an untagged Virtual Logical Area Network data packet, or if additional hardware filter 114 at an input or output of the device for an untagged Virtual Logical Area Network establishes a tagged Virtual Logical Area Network data packet.

Hardware filter 104 may be designed to detect the presence of a deviation if additional hardware filter 114 at an input or output of device 100 establishes a data packet having an unknown Ethertype, a false checksum or a false packet structure.

Hardware filter 104 may include a Dynamic Host Configuration Protocol filter as an additional hardware filter 114, which is designed to establish at the input or output of the device Dynamic Host Configuration Protocol packets for Internet Protocol Version 4 and/or for Internet Protocol Version 6 including Dynamic Host Configuration Protocol Port 67 and/or Port 68.

Hardware filter 104 may include a Transmission Control Protocol or User Datagram Protocol filter as additional hardware filter 114, which is designed to establish at the input or output of the device Transmission Control Protocol or User Datagram Protocol Broadcast messages for Internet Protocol Version 4 and/or for Internet Protocol Version 6.

Hardware filter 104 may include a Precision Time Protocol filter as additional hardware filter 114, which is designed to establish Precision Time Protocol messages at the input or output of the device, and to store their content, in particular, time stamp sequence number, correction field at least temporarily in a register for context information.

The described shapes of hardware filter 104 may be situated in parallel or in succession in hardware switch unit 102. Not all shapes of hardware filter 104 need be provided.

Hardware filter 104 is designed to send the interrupt for triggering the analysis for the data packet, the actual value of which has been compared, to microprocessor 106 if the deviation exists. In one aspect, hardware filter 104 is designed not to send the interrupt to microprocessor 106 if no deviation exists. In another aspect, hardware filter 104 is designed to compare the deviation with a threshold value and to send the interrupt for the analysis of the data packet, the actual value of which has been compared, to microprocessor 106 if the deviation exceeds the threshold value.

Figure 2:
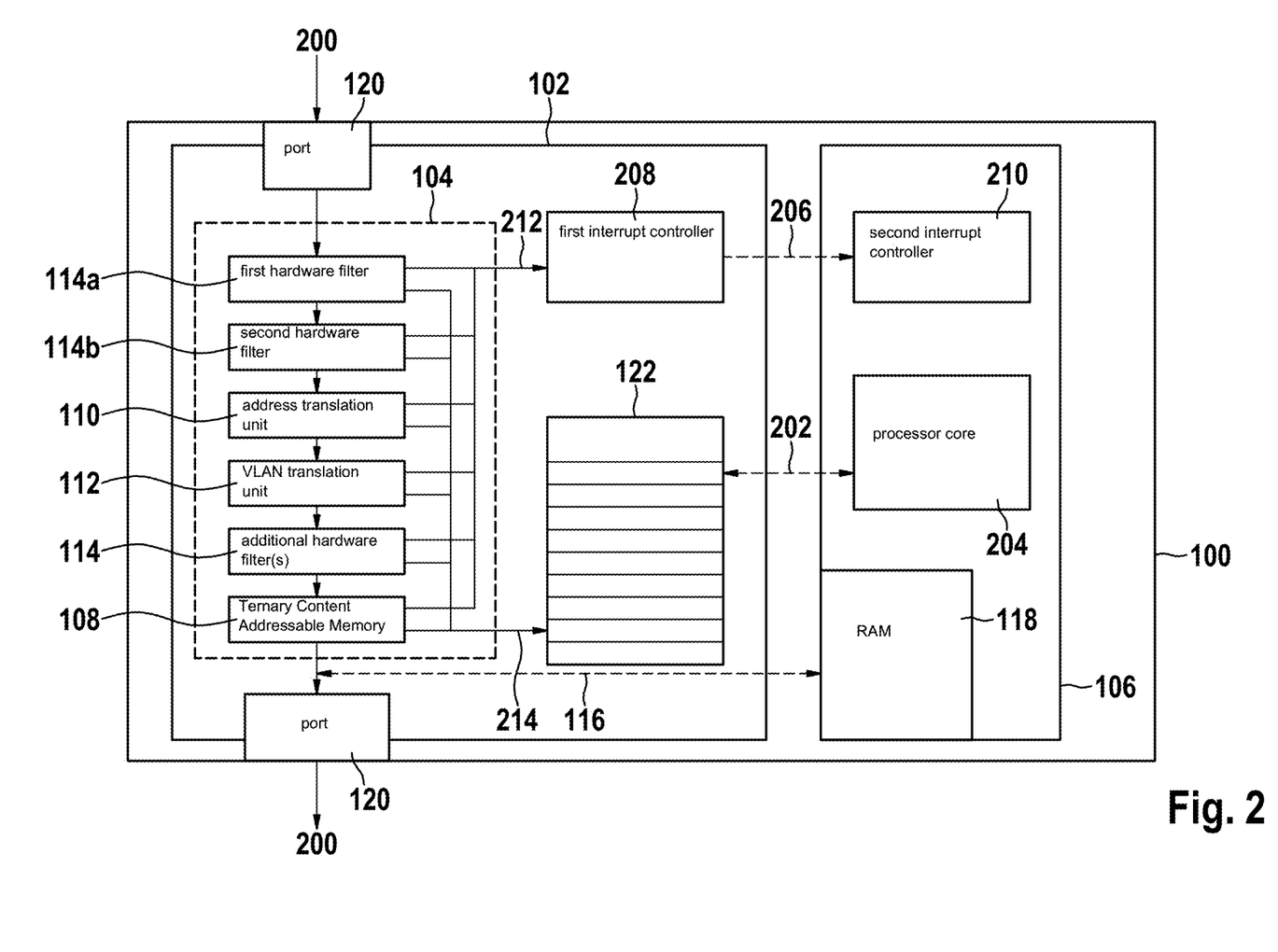
FIG. 2 shows a data flow in the device in accordance with an example embodiment of the present invention.

FIG. 2 depicts an exemplary data flow in device 100 for an Ethernet data packet 200. Ethernet data packet 200 is received at an input of device 100, i.e., in the example, at one of ports 120. Ethernet data packet 200 is sent at an output of device 100, i.e., in the example, at one of ports 120.

Between the input and the output, Ethernet data packet 200 runs through a first hardware filter 114a, which is designed to check the packet structure. First hardware filter 114a is designed to send the interrupt to microprocessor 106 if the packet structure does not correspond to the setpoint structure for Ethernet data packet 200 and otherwise not to send the interrupt. First hardware filter 114a is optionally designed to transmit Ethernet data packet 200 via data line 116 for microprocessor 106 into random access memory 118 if the packet structure does not correspond to the setpoint structure for Ethernet data packet 200 and otherwise not to transmit Ethernet data packet 200.

Between first hardware filter 114a and the output, Ethernet data packet 200 runs through a second hardware filter 114b, which is designed to check a checksum for Ethernet data packet 200. Second hardware filter 114b is designed to send the interrupt to microprocessor 106 if the checksum does not correspond to a setpoint checksum for Ethernet data packet 200 and otherwise not to send the interrupt. Second hardware filter 114a is optionally designed to transmit Ethernet data packet 200 via data line 116 for microprocessor 106 into random access memory 118 if the checksum does not correspond to the checksum for Ethernet data packet 200 and otherwise not to transmit Ethernet data packet 200.

Between second hardware filter 114b and the output, Ethernet data packet 200 runs through Address Translation Unit 110. Address Translation Unit 110 is designed to send the interrupt to microprocessor 106 if the deviation is detected and otherwise not to send the interrupt. Address Translation Unit 110 is optionally designed to transmit Ethernet data packet 200 via data line 116 for microprocessor 106 into random access memory 118 if the deviation is detected and otherwise not to transmit Ethernet data packet 200. Address Translation Unit 110 in the example also establishes port 120 for the output.

Between Address Translation Unit 110 and the output, Ethernet data packet 200 runs through Virtual Local Network Translation Unit 112. Virtual Local Network Translation Unit 112 is designed to send the interrupt to microprocessor 106 if the deviation is detected and otherwise not to send the interrupt. Virtual Local Area Network Translation Unit 112 is optionally designed to transmit Ethernet data packet 200 via data line 116 for microprocessor 106 into random access memory 118 if the deviation is detected and otherwise not to transmit Ethernet data packet 200. Virtual Local Area Network Translation Unit 112 in the example also establishes whether or not Ethernet data packet 200 may be sent via port 120, which is established as an output, according to the rules for the Virtual Local Area Network.

The sending does not occur, for example, if port 120 for this Virtual Local Area Network is not allowed to be used.

Between Virtual Local Area Network Translation Unit 112 and the output, Ethernet data packet 200 in the example runs through additional hardware filter 114. Additional hardware filter 114 is designed to send the interrupt to microprocessor 106 if the deviation is detected and otherwise not to send the interrupt. Ethernet data packet 200 is optionally transmitted via data line 116 for microprocessor 106 into random access memory 118 if the deviation is detected. Ethernet data packet 200 is otherwise not transmitted.

A first interface 202 between register 122 and microprocessor 106, more precisely, processor core 204 of microprocessor 106 is also depicted in FIG. 2.

A second interface 206 between a first interrupt controller 208 of hardware switch unit 102 and a second interrupt controller 210 in microprocessor 106 is also depicted in FIG. 2. Hardware filter 104 is connected via an interrupt data line 212 to first interrupt controller 208. Hardware filter 104 is designed to send the interrupt via interrupt data line 212 to first interrupt controller 208 if a deviation is established in hardware filter 104. For example, the interrupt is triggered by first hardware filter 114a, by second hardware filter 114b, by Ternary Content Addressable Memory 108, by Address Translation Unit 110, by Virtual Local Area Network Translation Unit 112, by Dynamic Host Configuration Protocol filter, by Transmission Control Protocol or User Datagram Protocol filter, by Precision Time Protocol filter and/or by additional hardware filter 114.

Register 122 is connected to hardware filter 104 via an interface 214 for context information. The context information is determined, for example, by first hardware filter 114a, by second hardware filter 114b, by Ternary Content Addressable Memory 108, by Address Translation Unit 110, by Virtual Local Area Network Translation Unit 112, by Dynamic Host Configuration Protocol filter, by Transmission Control Protocol or User Datagram Protocol filter, by Precision Time Protocol filter and/or of by additional hardware filter 114 as a function of Ethernet data packet 200 and stored in register 122 via interface 214.

First interrupt controller 208 is designed to send the interrupt via second interface 206 to second interrupt controller 210.

Second interrupt controller 210 is designed to activate processor core 204 to read context information from register 122 when the interrupt is received by second interrupt controller 210.

Microprocessor 106 is designed to carry out the analysis for the detection by the microprocessor of an intrusion pattern in a network traffic in the computer network as a function of the context information when the interrupt is received. The context information is read from microprocessor 106 via first interface 202. Changed context information is written by microprocessor 106 via first interface 202 into register 122.

The sequence described here is an exemplary sequence. It makes no difference in terms of the function whether, for example, first additional hardware filter 114 and then Address Translation Unit 110 is runs through or vice versa. This applies for all additional named components in the sequence depicted.

Ternary Content Addressable Memory 108 may be designed for a check of the payload, i.e., for a check of a content, which goes beyond layers 2 and 3. In this aspect, payload may also be filtered.

Figure 3:
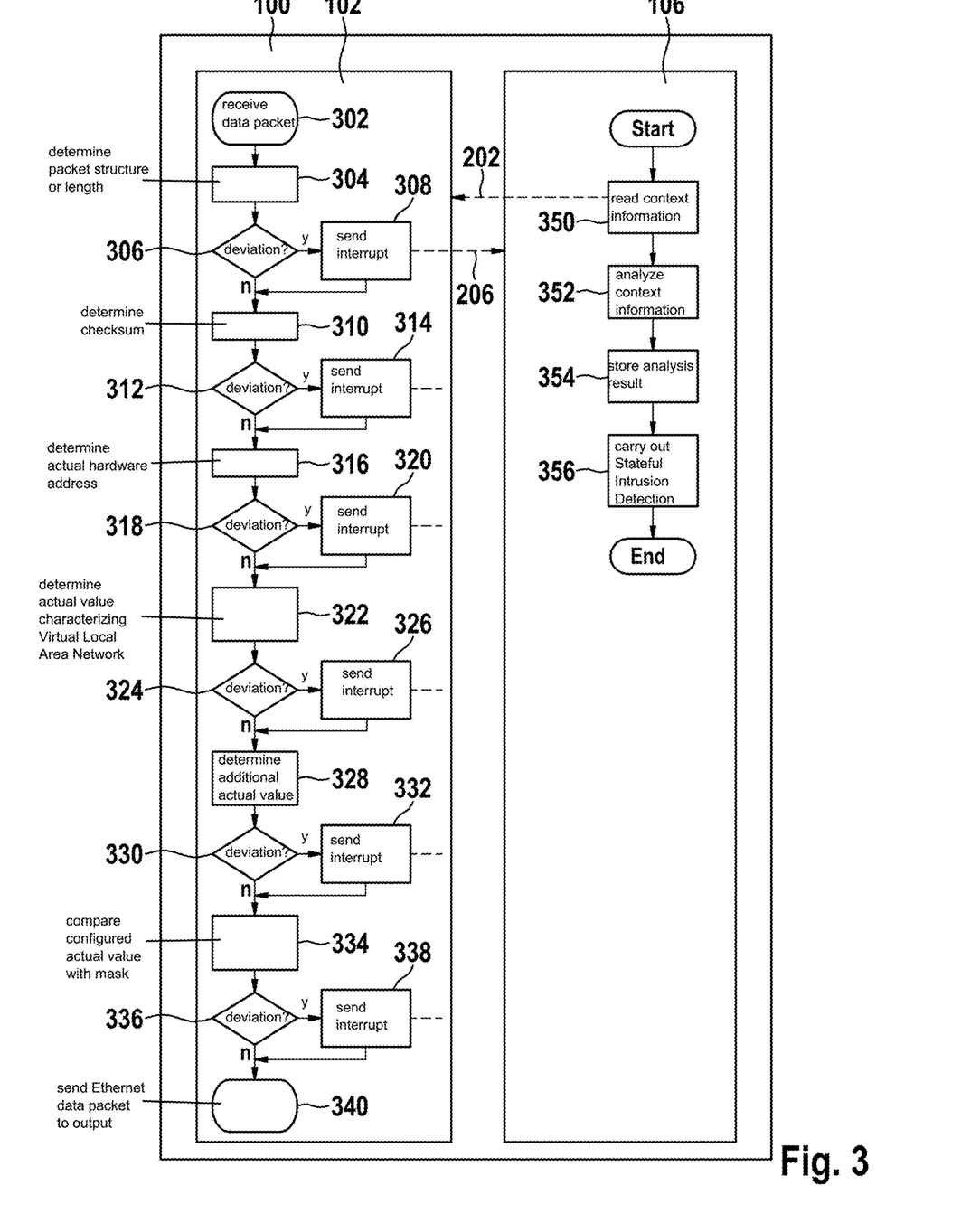
FIG. 3 shows steps in a method for the intrusion detection in accordance with an example embodiment of the present invention.

FIG. 3 depicts steps in a method for intrusion detection.

In a step 302, Ethernet data packet 200 is received at a port 120. A step 304 is subsequently carried out.

In a step 304, the packet structure or a packet length of the Ethernet data packet 200 is determined. A step 306 is subsequently carried out.

In step 306, it is checked whether a deviation of the packet structure from the setpoint structure or a deviation of a packet length from a setpoint length exists. It is checked, for example, whether an irregularity with respect to the packet structure exists.

If a deviation from the setpoint structure exists, a step 308 is carried out. If no deviation exists, a step 310 is carried out.

In step 308, the interrupt, optionally also Ethernet data packet 200, is sent to microprocessor 106. Step 310 is subsequently carried out.

In step 310, a checksum for Ethernet data packet 200 is determined. A step 312 is subsequently carried out.

In step 312, it is checked whether a deviation of the checksum from a setpoint checksum exists. For example, it is checked whether an irregularity with respect to the checksum exists.

If a deviation from the setpoint checksum exists, a step 314 is carried out. If no deviation [exists], a step 316 is carried out.

In step 314, the interrupt, optionally also Ethernet data packet 200, is sent to microprocessor 106. Step 316 is subsequently carried out.

In step 316, an actual hardware address for Ethernet data packet 200 is determined. A step 318 is subsequently carried out.

In step 318, it is checked whether the actual hardware address is known, in particular, matches a hardware address from a memory. For example, it is checked whether a known Media Access Control address exists.

If a deviation from, in particular, any hardware address known from the memory exists, a step 320 is carried out. If no such deviation exists, in particular, if the actual hardware address is known, a step 322 is carried out.

In step 320, the interrupt, optionally also Ethernet data packet 200, is sent to microprocessor 106. Step 322 is subsequently carried out.

In step 322, an actual value characterizing a Virtual Local Area Network is determined. A step 324 is subsequently carried out.

In step 324, it is checked whether the actual value corresponds to a setpoint value characterizing a Virtual Local Area Network, into which Ethernet data packet 200 may be sent at port 120 determined with the aid of the actual hardware address. A match to a setpoint value from a memory, in particular, is checked.

If a deviation between actual value and setpoint value exists, a step 326 is carried out. If no such deviation exists, a step 328 is carried out.

In step 326 the interrupt, optionally also Ethernet data packet 200, is sent to microprocessor 106. Step 328 is subsequently carried out.

In step 328 an additional actual value for an analysis with one of the described other hardware filters is optionally determined.

At the input or output, for example, for a tagged Virtual Logical Area, an untagged Virtual Logical Area Network Ethernet data packet 200 is established, or for an untagged Virtual Logical Area Network, a tagged Virtual Logical Area Network Ethernet data packet 200 is established.

At the input or output, for example, a Dynamic Host Configuration Protocol packet for Internet Protocol Version 4 and/or for Internet Protocol Version 6 including Dynamic Host Configuration Protocol port 67 and/or port 68 is established. For example, a User Datagram Protocol Broadcast message for Internet Protocol Version 4 and/or for Internet Protocol Version 6 is established at the input or output. For example, a Precision Time Protocol message is established at the input or output, the content of which, in particular, time stamp, sequence number, correction field, being stored at least temporarily in a register for context information.

A step 330 is subsequently carried out.

In step 330, it is checked whether a deviation of the additional actual value from an additional setpoint value for the additional actual value exists. If a deviation exists, a step 332 is carried out. Otherwise, a step 334 is carried out.

In step 332, the interrupt, optionally also Ethernet data packet 200, is sent to microprocessor 106. Step 334 is subsequently carried out.

In step 334, a configured actual value for Ethernet data packet 200 is compared with a mask configured therefor stored in the Ternary Content Addressable Memory. A step 336 is subsequently carried out.

In step 336, it is established as a function of the result of the comparison whether or not a deviation from the mask exists.

If a deviation exists, a step 338 is carried out. If no deviation exists, a step 340 is carried out.

In step 338, the interrupt, optionally also Ethernet data packet 200, is sent to microprocessor 106. Step 340 is subsequently carried out.

In step 340, Ethernet data packet 200 is sent to the output.

When the interrupt is received by microprocessor 106, a step 350 is carried out.

In step 350, the context information is read from the register.

A step 352 is subsequently carried out.

In step 352, the context information from register 122 is analyzed for detecting an intrusion pattern in the network traffic in the computer network. For example, a Stateless Intrusion Detection is carried out as a function of the context information. It may be provided to analyze the interrupts that occur over time. A step 354 is subsequently carried out.

In step 354, an analysis result of the Stateless Intrusion Detection is stored. For example, the context information is stored. A step 356 is subsequently carried out.

In step 356, a Stateful Intrusion Detection is carried out as a function of information about stored analysis results. For example, an analysis of the context data over time is analyzed. The method subsequently ends.

The context information may also be changed, for example, as a function of the result of the analysis, of the Stateful Intrusion Detection or of the Stateless Intrusion Detection.

This context information is determined in an additional step and stored in register 122.

What is claimed is:

1. A method for intrusion detection in a computer network, the method comprising the following steps:
- receiving a data packet at an input of a hardware switch unit;
- selecting an output of the hardware switch unit for sending the data packet or a copy of the data packet as a function of security layer information from the data packet and as a function of a hardware address;
- determining, by the hardware switch unit, context information for the data packet;
- comparing, by a hardware filter of the hardware switch unit, an actual value from a field of the data packet with a set point value for values from the field, the field including security layer data or mediation layer data;
- triggering an interrupt for a microprocessor as a function of a result of the comparison;
- carrying out by the microprocessor, triggered by the interrupt, an analysis for detecting an intrusion pattern in a network traffic in the computer network as a function of the context information for the data packet;
- wherein the computer network is an automotive network;
- wherein the context information for the data packet, determined by the hardware switch unit, is stored in a register, a register access of the microprocessor to the register taking place for the analysis; and
- wherein presence of a deviation is detected when:
  (i) a Dynamic Host Configuration Protocol filter at the input or the output establishes a Dynamic Host Configuration Protocol packet for Internet Protocol Version 4 and/or for Internet Protocol Version 6 including Dynamic Host Configuration Protocol port 67 and/or port 68; or
  (ii) a Transmission Control Protocol or User Datagram Protocol filter at the input or the output establishes a Transmission Control Protocol or User Datagram Protocol Broadcast message for Internet Protocol Version 4 and/or for Internet Protocol Version 6; or
  (iii) a Precision Time Protocol filter at the input or the output establishes a Precision Time Protocol message, a time stamp, or sequence number, or correction field, being stored at least temporarily in the register for context information.

2. The method as recited in claim 1, wherein the context information for the data packet is stored in the register when a deviation between the actual value and the setpoint value exists or exceeds the threshold value.

3. The method as recited in claim 1, wherein updated context information for the data packet is determined, by the microprocessor, as a function of a result of the analysis and is stored in the register.

4. The method as recited in claim 1, wherein the hardware filter includes a Ternary Content Addressable Memory, in which a mask for the setpoint value is stored, the actual value being compared with the mask stored in the Ternary Content Addressable Memory, and it being established as a function of the result of the comparison of the actual value with the mask whether or not a deviation exists.

5. The method as recited in claim 1, wherein the setpoint value characterizes a hardware address, the actual value being determined at the input or the output as a function of data from a hardware address field of a data packet.

6. The method as recited in claim 5, wherein the hardware address is a Medium Access Control address, and wherein the hardware address field is a Medium Access control address of the data packet.

7. The method as recited in claim 1, wherein the setpoint value characterizes a Virtual Local Area Network, and the actual value is determined as a function of data, which characterize an association of a data packet at the input or the output with a Virtual Local Area Network.

8. The method as recited in claim 1, wherein presence of a deviation is detected, either when the hardware filter at the input or the output for a tagged Virtual Logical Area Network establishes an untagged Virtual Logical Area Network data packet, or when the hardware filter at the input or the output for an untagged virtual logical area network establishes a tagged virtual logical area network data packet.

9. The method as recited in claim 1, wherein the presence of a deviation is detected when the hardware filter establishes a data packet at the input or the output has an unknown Ethernet type, or a false checksum, or a false packet length, or a false packet structure.

10. A device for intrusion detection in a computer network,
- wherein the device a system on a chip system, which includes a hardware switch unit, a hardware filter, a register, and a computing device for the intrusion detection, the device being configured to:
  - receive a data packet at an input of the hardware switch unit;
  - select an output of the hardware switch unit for sending the data packet or a copy of the data packet as a function of security layer information from the data packet and as a function of a hardware address;
  - determine, by the hardware switch unit, context information for the data packet;
  - compare, by the hardware filter of the hardware switch unit, an actual value from a field of the data packet with a set point value for values from the field, the field including security layer data or mediation layer data;
  - trigger an interrupt for the computing device as a function of a result of the comparison;
  - carry out by the computing device, triggered by the interrupt, an analysis for detecting an intrusion pattern in a network traffic in the computer network as a function of the context information for the data packet;
- wherein the computer network is an automotive network;
- wherein the context information for the data packet, determined by the hardware switch unit, is stored in a register, a register access of the microprocessor to the register taking place for the analysis; and
- wherein presence of a deviation is detected when:
  (i) a Dynamic Host Configuration Protocol filter at the input or the output establishes a Dynamic Host Configuration Protocol packet for Internet Protocol Version 4 and/or for Internet Protocol Version 6 including Dynamic Host Configuration Protocol port 67 and/or port 68; or
  (ii) a Transmission Control Protocol or User Datagram Protocol filter at the input or the output establishes a Transmission Control Protocol or User Datagram Protocol Broadcast message for Internet Protocol Version 4 and/or for Internet Protocol Version 6; or
  (iii) a Precision Time Protocol filter at the input or the output establishes a Precision Time Protocol message, a time stamp, or sequence number, or correction field, being stored at least temporarily in the register for context information.

11. The device as recited in claim 10, wherein the hardware switch unit is configured to store the context information for the data packet in the register when a deviation between the actual value and the setpoint value exists, or a threshold value is exceeded.

12. The device as recited in claim 10, wherein the computing device is configured to determine updated context information for the data packet as a function of a result of the analysis and to store the determined updated context information for the data packet in the register.

13. The device as recited in claim 10, wherein a Ternary Content Addressable Memory, and/or an Address Translation Unit, and/or a Virtual Local Area Network Translation Unit, and/or the Dynamic Host Configuration Protocol filter, and/or the Transmission Control Protocol or User Datagram Protocol filter, and/or the Precision Time Protocol filter, is the hardware filter and is configured to check the data packet for the intrusion detection and to provide the interrupt to the microprocessor for the intrusion detection as a function of the result of the check.

14. A non-transitory computer-readable memory medium on which is stored a computer program for intrusion detection in a computer network, the computer program, when executed by a computer, causing the computer to perform or control the following steps:

receiving a data packet at an input of a hardware switch unit;

selecting an output of the hardware switch unit for sending the data packet or a copy of the data packet as a function of security layer information from the data packet and as a function of a hardware address;

determining, by the hardware switch unit, context information for the data packet;

comparing, by a hardware filter of the hardware switch unit, an actual value from a field of the data packet with a set point value for values from the field, the field including security layer data or mediation layer data;

triggering an interrupt for a microprocessor as a function of a result of the comparison;

carrying out by the microprocessor, triggered by the interrupt, an analysis for detecting an intrusion pattern in a network traffic in the computer network as a function of the context information for the data packet;

wherein the network is an automotive network;

wherein the context information for the data packet, determined by the hardware switch unit, is stored in a register, a register access of the microprocessor to the register taking place for the analysis; and wherein presence of a deviation is detected when:

(i) a Dynamic Host Configuration Protocol filter at the input or the output establishes a Dynamic Host Configuration Protocol packet for Internet Protocol Version 4 and/or for Internet Protocol Version 6 including Dynamic Host Configuration Protocol port 67 and/or port 68; or (ii) a Transmission Control Protocol or User Datagram Protocol filter at the input or the output establishes a Transmission Control Protocol or User Datagram Protocol Broadcast message for Internet Protocol Version 4 and/or for Internet Protocol Version 6; or (iii) a Precision Time Protocol filter at the input or the output establishes a Precision Time Protocol message, a time stamp, or sequence number, or correction field, being stored at least temporarily in the register for context information.

\* \* \* \* \*